C. F. Eastlack,
Cattle Pump.

No. 79,217.                    Patented June 23, 1868.

Witnesses
J. H. Smith
A. Tower

Inventor
Charles F. Eastlack
Chipman Hosmer & Co
Attys

United States Patent Office.

CHARLES F. EASTLACK, OF MANTUA, NEW JERSEY.

Letters Patent No. 79,217, dated June 23, 1868.

IMPROVEMENT IN PUMPS.

*The Schedule referred to in these Letters Patent and making part of the same.*

TO ALL WHOM IT MAY CONCERN:

Be it known that I, CHARLES F. EASTLACK, of Mantua, in the county of Gloucester, and State of New Jersey, have invented a new and valuable Improvement in Pumps; and I do hereby declare that the following is a full, clear, and exact description of the construction and operation of the same, reference being had to the annexed drawings, making a part of this specification, and to the letters and figures of reference marked thereon.

Figure 1 of the drawings represents a plan view of my device.

Figure 3:
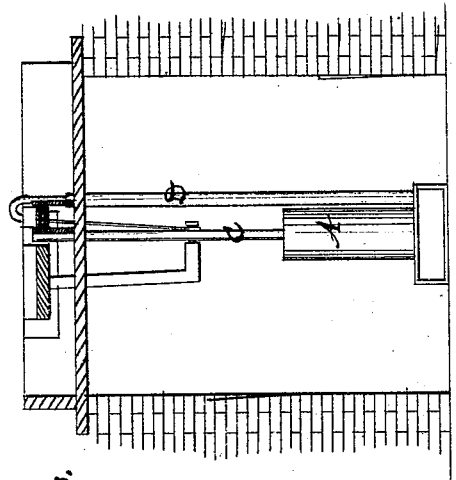
Figure 3 is a sectional view on the line $a\,v$ of fig. 1.
Figure 2:
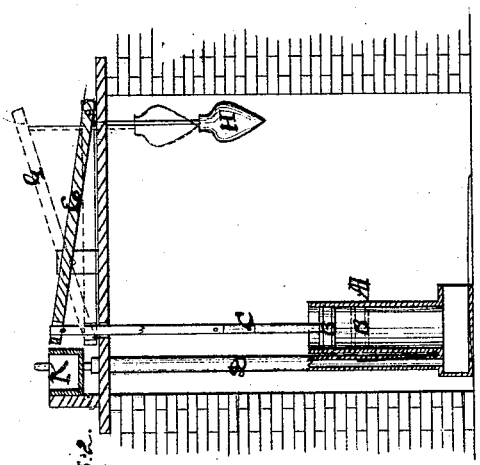
Figure 2 is a sectional view on the line marked $y\,y$ on fig. 1.
Figure 1:
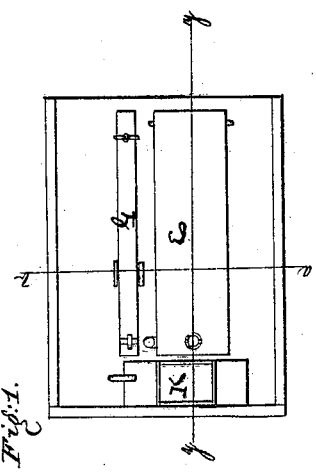

The object of my invention is to provide better means than have heretofore been known or used for enabling an animal or human being to pump water from a well, cistern, lake, or stream, by simply standing upon a platform.

The letter A, of the drawings, represents a cylinder, adjusted and arranged in the form usual for force-pumps.

Letter B is the plunger, and letter C the piston.

Letter D is the pipe through which the water is conveyed to the trough or bucket.

Letter E is a platform, attached to the piston C in the manner shown, and letter G is a lever, pivoted near its centre. This lever is connected to the piston C by a wire or chain, and it has at its outer end a weight, H. The function of this lever G and its details is to draw the plunger B upward, after said plunger has emptied the cylinder, and also to raise the platform E to its proper place, after having been pressed downward.

The letter K is a trough, into which the water is conducted through pipe D. It is covered over its entire surface, except about one foot square in the centre of said surface, to admit the water, and also to allow room for an animal to drink.

In constructing these pumps, I advise that the cylinder be made about fifteen inches in diameter, and that provisions be made for about one-foot stroke of the piston. This arrangement will secure the transfer of between seven and eight gallons of water from the well to the trough at each full movement of the platform E.

It will be noticed that this platform is held to the ground by a staple, $m$, at its outer end.

My device is operated as follows, to wit: Premising that the cylinder is filled with water, and an animal desires to drink, he passes upon the platform towards the trough, which, it will be observed, is constructed and arranged in such manner that the opening therein can only be reached while the animal stands on the platform. The weight of the animal presses the platform downward, and with it the piston C and plunger B. The result is that the water in the cylinder is forced upward through the pipe D and into the trough, and from which the animal may drink.

My device is not confined to the uses of animals only. It can easily be constructed on a smaller scale, and thereby be adapted to domestic purposes. By its use the hardships of the pump-handle will be exchanged for the pleasure and novelty of pumping water by the weight of the servants or children.

After the platform has been pressed downward, and the weight is removed therefrom, the lever G, with its weight H, restores the platform to its original place, and prepares it for another movement downward.

What I claim as my invention, and desire to secure by Letters Patent, is—

A pump, having cylinder A, plunger B, piston C, pipe D, platform E, lever G, and trough K, constructed, combined, and arranged substantially as and for the purposes specified.

CHARLES F. EASTLACK.

Witnesses:
J. C. SMITH,
A. TOWER.